L. Billings,
Hoe.
No. 97,863.  Patented Dec. 14, 1869.
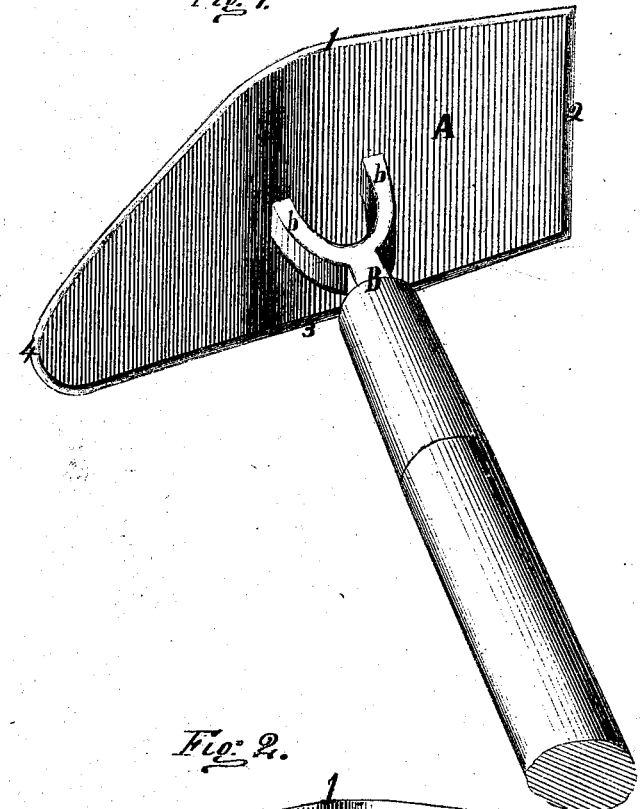
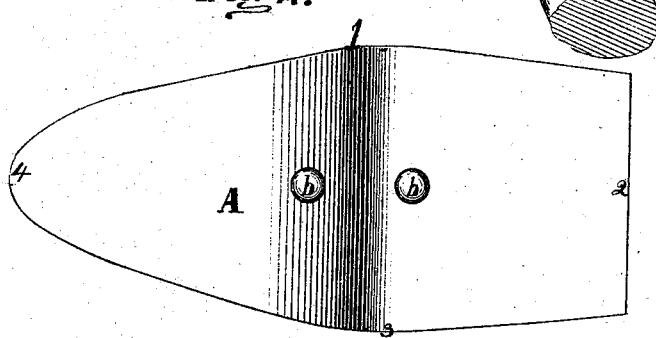
Witnesses:  
U. C. Clayton  
J. G. Clayton
Inventor:  
Lewis Billings  
by his Attys  
Jo. C. Clayton & Co

United States Patent Office.

LEWIS BILLINGS, OF GALLIPOLIS, OHIO.

Letters Patent No. 97,863, dated December 14, 1869.

IMPROVEMENT IN HOES.

The Schedule referred to in these Letters Patent and making part of the same.

*To all whom it may concern:*

Be it known that I, LEWIS BILLINGS, of Gallipolis, in the county of Gallia, and in the State of Ohio, have invented a certain new and useful "Universal Hoe;" and I do hereby declare that the following is a full, clear, and exact description thereof, reference being had to the accompanying drawings, and to the letters of reference marked thereon.

The nature of my invention consists in constructing a hoe for weeding, cultivating, and other like agricultural operations, so that the blade shall have four cutting-edges, and yet be strong and firm by means of the staple or bifurcated handle to which it is secured, as will more fully hereinafter appear.

To enable others skilled in the art to make and use my invention, I will proceed to describe its construction and operation.

Figure 1, in the drawings, is a perspective view of my hoe, and

Figure 2 is an end view of the same, in which the preferred form of my hoe is shown, and ends of the bifurcated handle made into rivet-heads, by means of which the hoe is firmly attached to the handle.

The blade A of my hoe is made of sheet-steel or iron, and in the form shown in fig. 2, and slightly bent, as shown in fig. 1, at its centre, and the ends of the bifurcated handle B pass through the blade of the hoe, and are formed into rivet-heads in the usual way.

These ends $b$ are placed so that one of them is on the right and the other on the left of the bend at the centre of the blade, and serve to maintain the hoe in the bent shape.

In using my hoe, if one edge of the hoe becomes dull, another side may be brought immediately into use, without the necessity of leaving the work to have the hoe sharpened; or, in weeding among young plants, the sides 1, 2, and 3 may be too wide to use with ease and safety, so that it would be found desirable to use side or edge 4.

The advantages peculiar to my hoe consist in having four cutting-edges, of three different widths, on the blade, and its strength and stiffness secured by the bend of the blade, which bend of the blade is maintained by the manner of connecting the hoe and handle together.

Having thus fully described my invention,

What I claim as new, and desire to secure by Letters Patent, is—

The hoe-blade A, constructed as herein described, in combination with the bifurcated handle $b\ b$, and operating as and for the purposes set forth.

In testimony that I claim the above-described certain new and useful "universal hoe," I have hereunto signed my name, this 7th day of June, 1869.

L. BILLINGS.

Witnesses:
WM. NASH,
W. W. MILLS.